United States Patent
Neitzel (12)

(10) Patent No.: US 6,279,247 B1
(45) Date of Patent: Aug. 28, 2001

(54) COMBINATION RELIEF VENT AND DIPSTICK APPARATUS FOR AN OIL FILLED PIN JOINT

(75) Inventor: Daniel R. Neitzel, Elgin, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/392,951

(22) Filed: Sep. 9, 1999

(51) Int. Cl.[7] .............................. G01F 23/04; F16C 11/00
(52) U.S. Cl. .......................... 33/727; 137/493.4; 403/38
(58) Field of Search .............................. 33/722, 723, 724, 33/725, 726, 727, 728, 729, 730, 731; 137/493.4, 541, 542; 403/31, 38, 150, 162

(56) References Cited

U.S. PATENT DOCUMENTS

| 1,476,321 | 12/1923 | Ashworth et al. . |
| 1,864,138 | 6/1932 | Machonis . |
| 2,297,850 | 10/1942 | Woolery . |
| 2,937,449 | 5/1960 | Bade . |
| 2,969,763 | 1/1961 | Foster . |
| 3,662,470 | 5/1972 | Sasgen . |
| 3,939,866 | * 2/1976 | Pignatelli ........................ 137/493.4 |
| 4,067,113 | 1/1978 | Haines et al. . |
| 4,091,671 | 5/1978 | McLees . |
| 4,522,170 | 6/1985 | Lenk et al. . |
| 4,910,495 | 3/1990 | Sullivan . |
| 5,129,422 | 7/1992 | Davison, Jr. et al. . |
| 5,630,673 | 5/1997 | Krzywanos et al. . |
| 5,720,566 | * 2/1998 | Allen et al. ........................ 403/38 |

* cited by examiner

*Primary Examiner*—Diego Gutierrez
*Assistant Examiner*—R. Alexander Smith
(74) *Attorney, Agent, or Firm*—Haverstock, Garrett & Roberts; Liza J. Meyers

(57) ABSTRACT

The implement linkage of a work machine comprises at least one oil dilled pin joint. During operation of the linkage, pressure can build up in the pin joint, thus causing damage to the pin joint. It is desirable to vent this pressure without allowing oil to escape from the pin joint. It is also desirable to measure the level of the oil in the pin joint. A combination relief vent and dipstick apparatus which allows both these tasks to be accomplished with one apparatus is disclosed herein.

16 Claims, 7 Drawing Sheets

COMBINATION RELIEF VENT AND DIPSTICK APPARATUS FOR AN OIL FILLED PIN JOINT

TECHNICAL FIELD

This invention relates generally to pin joints for use in pivotally connecting linkage components for supporting and articulating a work implement or tool of a loader vehicle or the like, and more particularly, to an oil filled pin joint including a combination relief vent and dipstick apparatus.

BACKGROUND ART

Pivoting pin joints for loader linkages and the like are normally lubricated with either grease or oil. Oil lubricated joints are typically preferred because they afford greater load carrying capacity than grease lubricated joints, and they eliminate the routine maintenance needed to grease the joints on a daily or per shift basis. For this reason, oil lubricated joints are commonly referred to as low maintenance or maintenance free joints. However, such maintenance free joints must have an effective sealing system to prevent the loss of lubricating oil from the joint that would otherwise result in joint failure. Reference for instance, Reinsma et al. U.S. Pat. No. 4,961,667 issued Oct. 9, 1990 to Caterpillar Inc., which discloses a typical known pivot joint for loader linkages and the like. This known pivot joint includes a pin extending through a main oil cavity or reservoir and journals defined by bearings at opposite ends of the main oil cavity or reservoir. The main oil cavity and journals contain a predetermined quantity of oil sufficient for at least substantially immersing the pin. The oil is retained in the joint by seals at opposite ends of the bearings, the seals also serving to keep dust, dirt and other foreign matter from entering the joint and contaminating the oil. This latter function is particularly significant when the operating environment for the joint is severe, that is, wherein substantial dust, dirt or other foreign matter is present, such as when the loader is used at a construction site or mine, as a build up of contaminants in the pin joint can contribute to premature failure thereof.

As is also typical of oil filled joints, the oil therein is subject to varying temperatures and will expand when heated and contract when cooled. When the oil expands, if the joint is not sufficiently vented, the fluid in the joint, including the oil and any air or other fluids, can be subjected to compressive loading so as to exert outward pressure on the seals, eventually leading to premature wear thereof and oil leakage. Conversely, when the oil contracts, if the joint is not sufficiently vented, a negative pressure or partial vacuum condition can be created in the joint so as to draw air along with damaging contaminants from the environment through the seals into the joint. Additionally, sometimes when the members joined together by the joint are moved one relative to the other, such as when a heavy load is lifted or dumped, or a hard object is contacted by the implement, a rapid pressure increase or spike can occur in the joint, which should be vented to avoid eventual damage to the seals.

One known proposed solution to the above-described seal related problems is to use seals which exert higher contact pressures against the opposing sealing surfaces. However, these seals are more costly and have operational disadvantages, namely, more friction is created between the seals and the opposing sealing surfaces, which can also result in greater seal wear.

Various relief vent and breather constructions are well know in the art. However, an anticipated problem with using the known relief vent and breather constructions on pin joints is oil loss through the vent or breather when the joint is articulated through angular orientations wherein the vent or breather is at least partially inverted or otherwise brought into contact with the oil in the joint such as by splashing or the like. Additionally, because of the articulation of the joint and the possibility of shock and other severe loading from abrupt contact between the loader bucket with hard objects and the like, a vent or breather used with an oil filled pin joint should be ruggedly constructed, securably mounted, and easily serviceable and/or replaceable as required.

Further, currently, the oil level in oil filled pin joints is determined by measuring a quantity of oil then filling the cavity or reservoir of the pin joint with the measured quantity of oil. However, this is a time consuming process. It is thus desirable to shorten the time required for determining the oil level in a pin joint.

Still further, it would be advantageous to combine the pressure relief or breather and oil measuring aspect of a pin joint in a single device, and to provide interchangeability of different pressure relief or breather devices and dipsticks of different lengths and types.

Reference Haines et al. U.S. Pat. No. 4,067,113 issued Jan. 10, 1978 to Estan Manufacturing Company; and Davison, Jr. et al. U.S. Pat. No. 5,129,422 issued Jul. 14, 1992 to General Motors Corporation, which disclose respectively a dipstick with pressure relief valve and a transmission breather control valve which suffer from many of the above described problems.

Accordingly, the present invention is directed to overcoming one or more of the problems as set forth above.

DISCLOSURE OF THE INVENTION

According to one aspect of the present invention, an oil filled pin joint including a combination relief vent and dipstick apparatus is disclosed. The combination relief vent and dipstick apparatus includes a body member having first and second opposite end portions, a passage extending therethrough between the opposite end portions, a valve seat extending around the passage, and structure for removably mounting the body member in an orifice of the pin joint with the first end portion in communication with the cavity or reservoir thereof containing the oil. The first end portion of the body member includes a dipstick adapted to extend into the cavity so as to be partially immersed in the oil in the cavity when at a predetermined level so as to provide an indicator of the oil level. A valve assembly is disposed or mounted in the passage of the body member. The valve assembly includes a valve member movable between a closed position in a sealed relation to the valve seat and a range of open positions spaced from the valve seat. A biasing member yieldably urges the valve member toward its closed position, fluid in the cavity at a pressure greater than a predetermined pressure level being operable to move the valve member in opposition to the biasing member away from the closed position to one of the open positions to allow some of the fluid to escape from the cavity to atmosphere through the passage such that the pressure is reduced to the first predetermined pressure level. The valve assembly can optionally include a second valve seat, a second valve member movable between a closed position in sealed relation to the second valve seat and a range of open positions spaced from the second valve seat, and a second biasing member yieldably urging the second valve member toward the closed position, fluid in the cavity at a pressure less than a second predetermined pressure level being operable to move the second valve member in opposition to the second biasing member away from the closed position to allow fluid from atmosphere to enter the cavity through the passage to allow the pressure in the cavity to rise to the second predetermined pressure level.

BEST MODE FOR CARRYING OUT THE INVENTION

Figure 1:
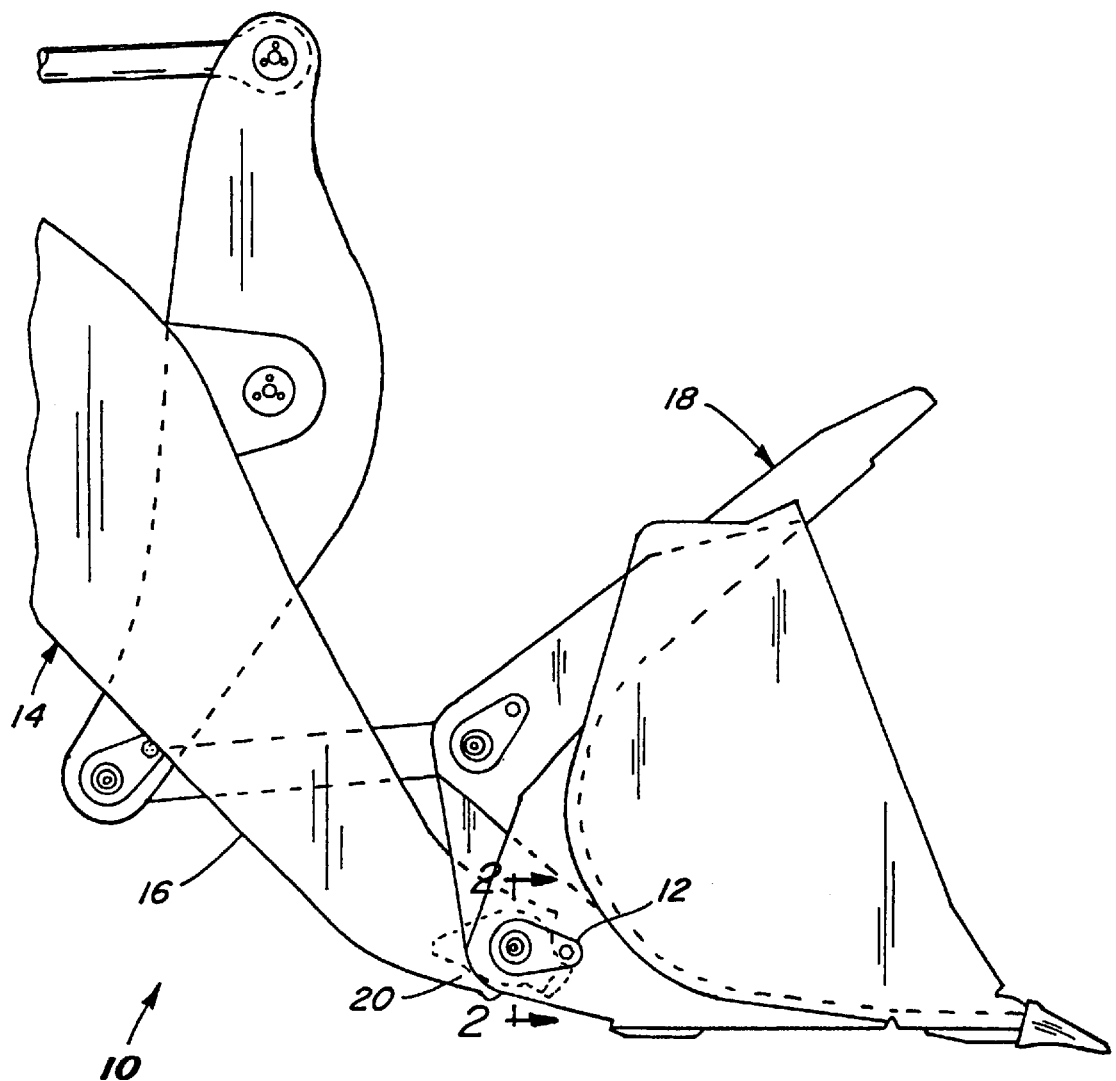
FIG. 1 is a fragmentary side view of a front end loader vehicle equipped with an oil filled pin joint including combination pressure relief vent and dipstick apparatus according to the present invention.

The front end of a work machine, such as a wheel loader 10, is shown in FIG. 1. It should be known and understood that although a wheel loader 10 is illustrated and described herein that any work machine, such as, but not limited to, another material handling machine, or other machine or device, may be utilized for the invention hereinafter described. Wheel loader 10 has a structural frame 14 including a pivotally mounted lift arm 16. Lift arm 16 pivotally supports a bucket 18 articulatable for scooping and lifting soil, minerals and other materials, as is well known in the art. Bucket 18 is pivotally connected to lift arm 16 with an oil sealed pin joint 20 located behind a pin retainer plate 12.

Figure 2:
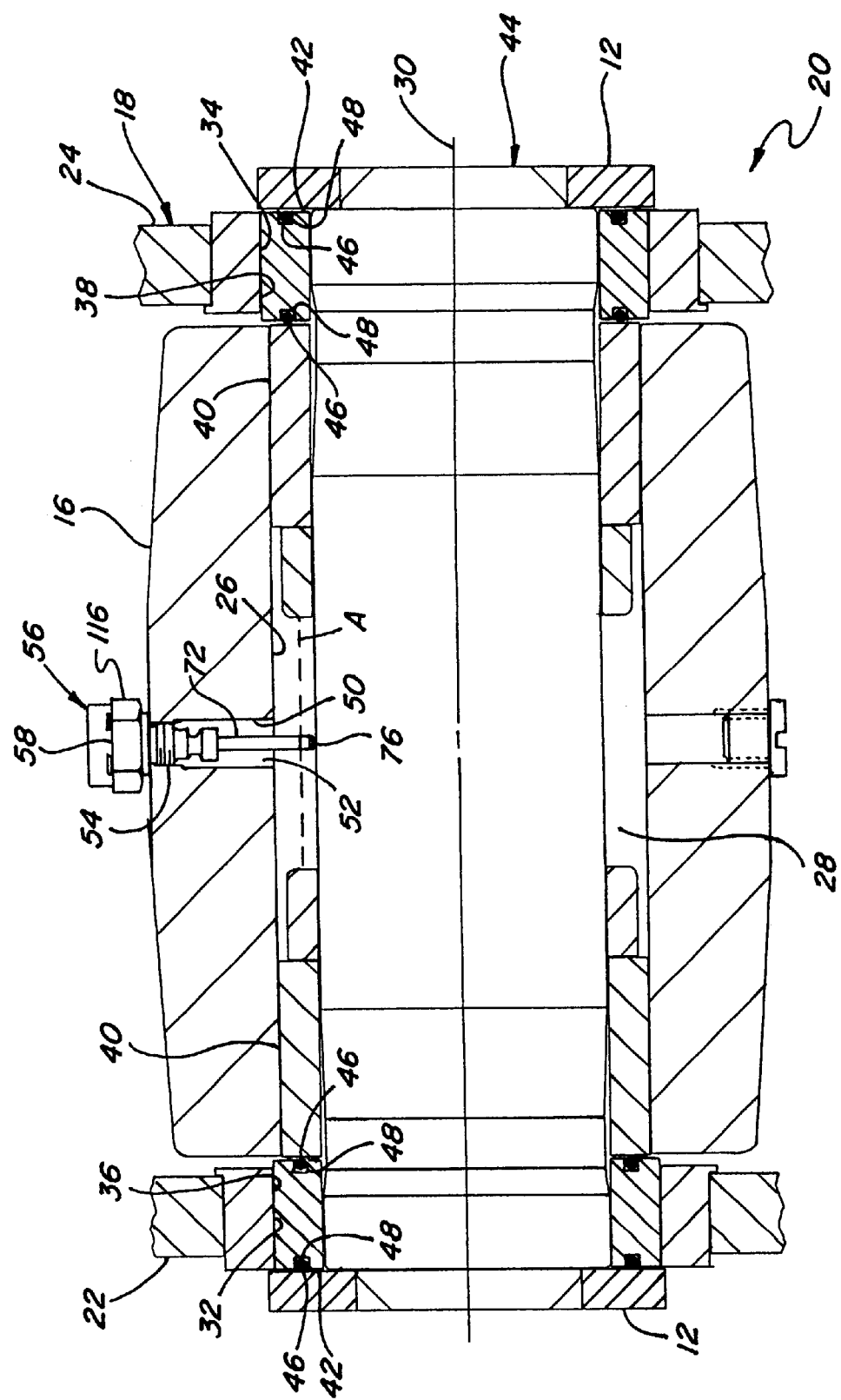
FIG. 2 is a cross-sectional view taken along line 2—2 of FIG. 1 showing the oil filled pin joint and the combination relief vent and dipstick apparatus of the invention.

Referring also to FIG. 2, lift arm 16 is disposed between two brackets 22 and 24 of bucket 18. Lift arm 16 includes an annular bearing seat 26 defining a cavity 28 having an axis 30 extending therethrough, and brackets 22 and 24 include annular inner side walls 32 and 34, respectively, defining apertures 36 and 38 therethrough, apertures 36 and 38 being axially aligned with cavity 28. A pair of annular sleeve bearings 40 are press fit against bearing seat 26 so as to be retained in cavity 28 of arm 16 adjacent the respective ends of cavity 28. A pair of annular collar bearings 42 are press fit against side walls 32 and 34 of brackets 22 and 24, respectively, and together with bearings 40, support an elongate pin 44 for relative rotation therein. Pin 44 rotatably connects bucket 18 to lift arm 16 to allow relative articulation thereof, as is well known in the art. Pin 44 is maintained in axial position in bearings 40 and 42 by pin retainer plates 12 which are located in abutting relation to the opposite axial ends of pin 44. Collar bearings 42 each include opposite axially facing annular grooves 46 containing face seals 48.

Face seals 48 each include a resiliently biasable element which is compressed such that the face seal 48 exert a sealing contact pressure against an opposing axial surface of one of the pin retainer plates 12 or bearings 40 for sealably enclosing cavity 28.

Cavity 28 contains a quantity of oil which is desirably maintained at a predetermined level represented by the dashed line A so as to cover or immerse pin 44 to provide lubrication in journals between pin 44 and bearings 40 and 42. Lift arm 16 includes an endless side wall portion 50 defining an orifice 52 extending therethrough between atmosphere and cavity 28 at a location above pin 44, side wall portion 50 including an internally threaded portion 54.

Figure 3:
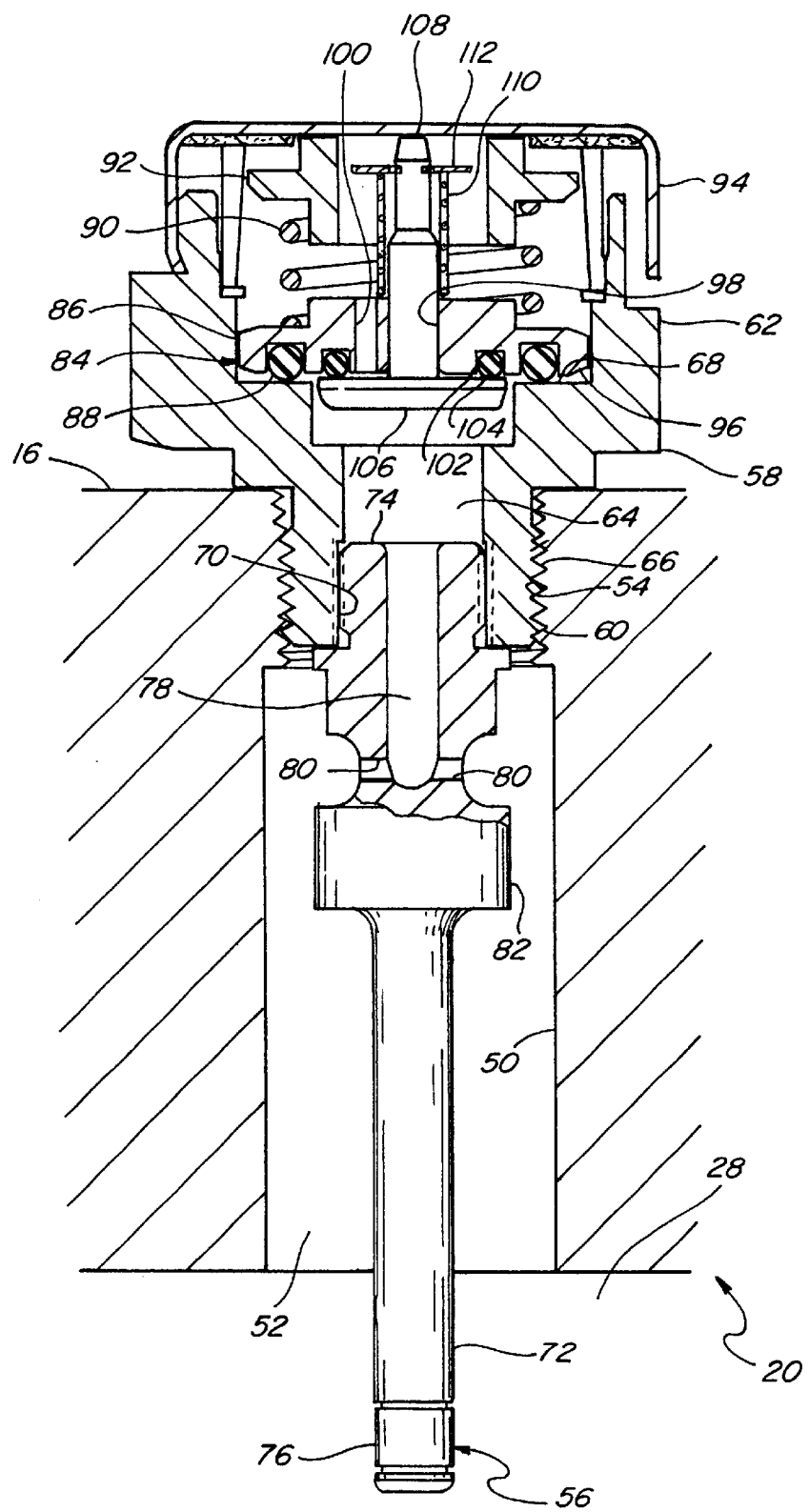
FIG. 3 is an enlarged fragmentary sectional view of the pin joint and the combination relief vent and dipstick apparatus.

Referring also to FIG. 3, a combination relief vent and dipstick apparatus 56 constructed and operable according to the teachings of the present invention is threadedly mounted in orifice 52 in communication with cavity 28. Combination relief vent and dipstick apparatus 56 includes a body member 58 having a first end portion 60 and an opposite second end portion 62, and a passage 64 extending through body member 58 between end portions 60 and 62. First end portion 60 of body member 58 includes an externally threaded portion 66 threadedly engaged with threaded portion 54 of side wall portion 50 of lift arm 16 for removably mounting apparatus 56 with first end portion 60 of body member 58 in sealed relation in orifice 52 in communication with cavity 28, and second end portion 62 in communication with atmosphere. Body member 58 includes an annular first valve seat 68 extending around passage 64 adjacent first end portion 60, and an internal threaded portion 70 extending around passage 64 adjacent second end portion 62. An elongate dipstick 72 having an externally threaded end 74 is threadedly mounted to threaded portion 70 of body member 58 such that an opposite distal end 76 of the dipstick extends downwardly through orifice 52 a predetermined distance into cavity 28 so as to be at least partially immersed in the oil therein when at the predetermined level A. Threaded end 74 of dipstick 72 includes a longitudinally extending bore 78 communicating with a pair of transverse extending ports 80 communicating with cavity 28 through orifice 52. Dipstick 72 additionally includes a splash guard 82 extending therearound between distal end 76 and ports 80.

Apparatus 56 includes a valve assembly 84 mounted in passage 64. Valve assembly 84 includes a generally disc shaped first valve member 86 having an O-ring 88 mounted in a groove therein in position for sealably engaging first valve seat 68 when first valve member 86 is in a closed position as shown. Alternatively, valve member 86 can be constructed for making direct contact with first valve seat 68 to eliminate O-ring 88. A first biasing member 90 which is a coil spring is compressed between first valve member 86 and a spring retainer 92 to yieldably urge first valve member 86 toward its closed position in engagement with first valve seat 68. Spring retainer 92 is maintained in position by a dust cap 94 mounted to body member 58 over passage 64. First valve member 86 includes at least one notch 96 through a peripheral edge thereof radially outwardly of O-ring 88. First valve member 86 additionally includes a central bore 98 therethrough, at least one additional bore 100 therethrough adjacent bore 98, and a second O-ring 102 mounted in a groove extending around bores 98 and 100 forming a second valve seat 104.

A second disc shaped valve member 106 has a closed position as shown in sealable engagement with second valve seat 104 and includes a stem 108 which extends through bore 98 of first valve member 86. A second biasing member 110 which is a coil spring is compressed between first valve member 86 and a retainer clip 112 mounted in a groove around stem 108 to yieldably urge second valve member 106 toward its closed position in engagement with second valve seat 104. Here again, it should be noted that as an alternative, first valve member 86 may be constructed for making direct sealing contact with second valve member 106 to eliminate the need for O-ring 102.

Figure 4:
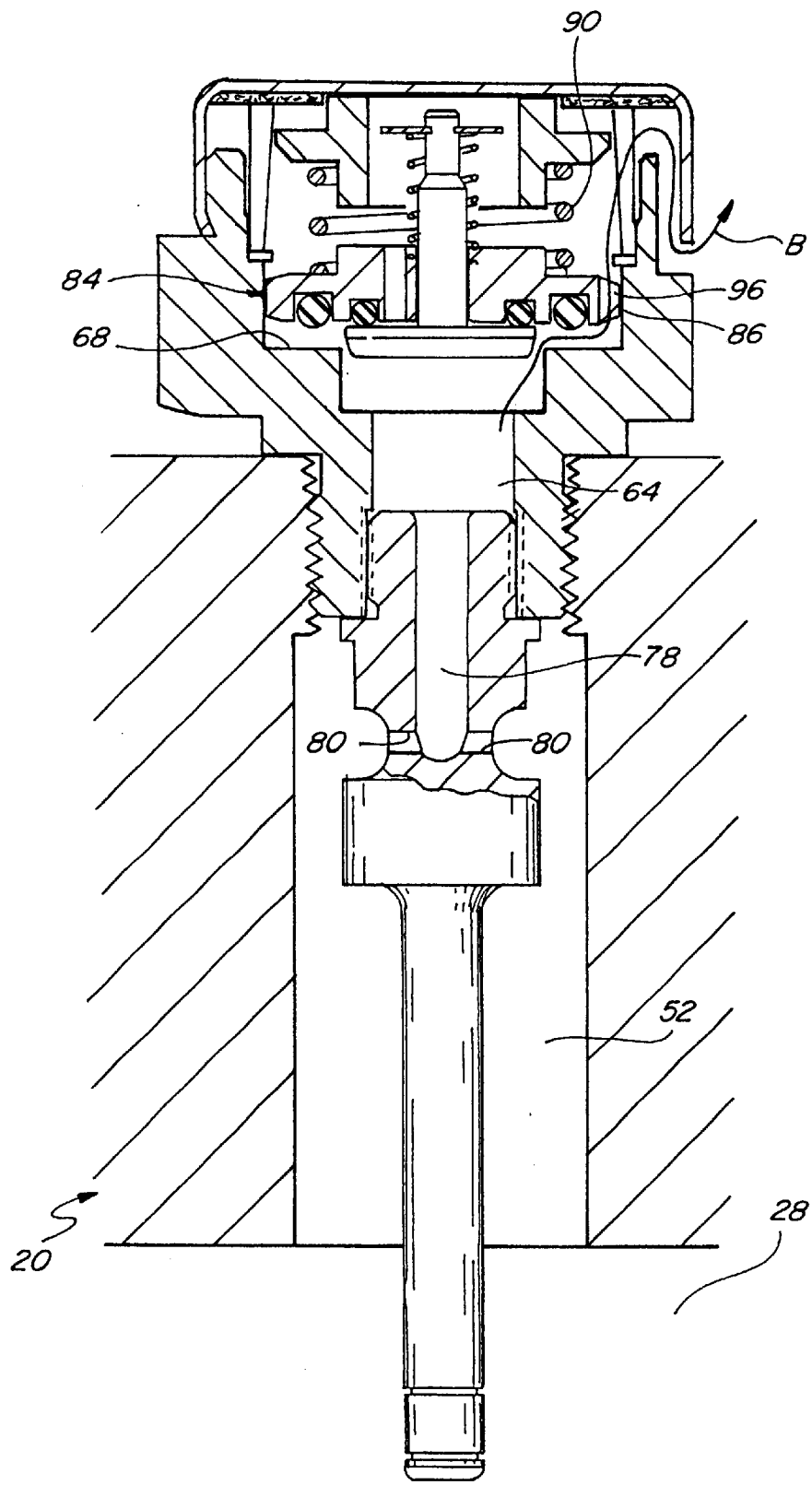
FIG. 4 is another enlarged fragmentary sectional view of the pin joint showing the combination relief vent and dipstick apparatus in a pressure relief mode for allowing fluid to escape from the pin joint.

Referring to FIG. 4, in operation, fluid pressure conditions in cavity 28 of pin joint 20 will be communicated through orifice 52, ports 80, bore 78 and passage 64 to valve assembly 84. Fluid at a pressure greater than a first predetermined pressure level is operable to act against first valve member 86 to move first valve member 86 in opposition to first biasing member 90 away from its closed position in sealed engagement with valve seat 68 to one of a range of open positions spaced therefrom such that the fluid can pass through notch or notches 96 of the first valve member to escape to atmosphere as shown by the arrow B, first valve member returning to its closed position when the pressure in cavity 28 is lowered to the first predetermined pressure level.

Figure 5:
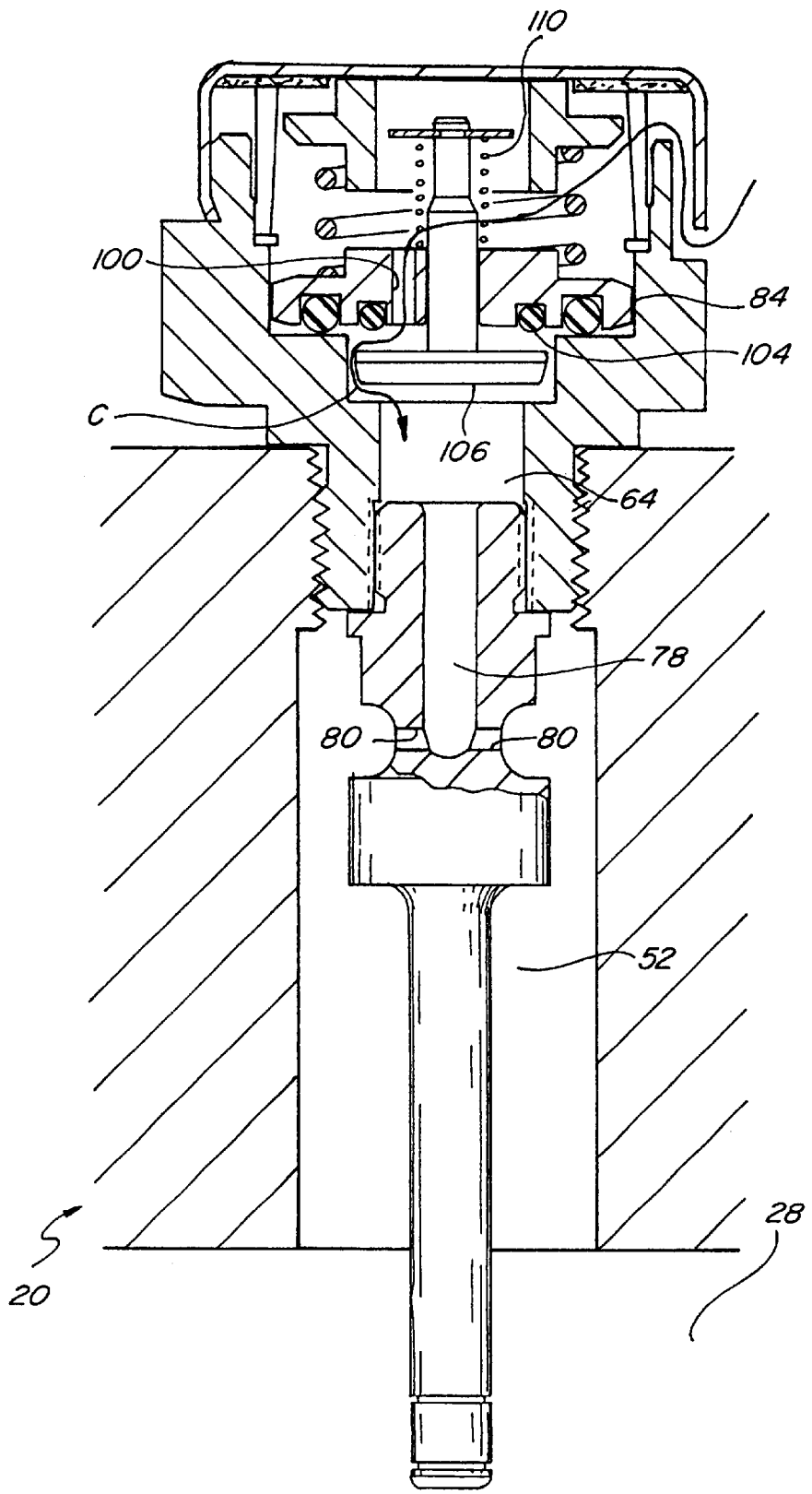
FIG. 5 is another enlarged fragmentary sectional view of the pin joint showing the combination relief vent and dipstick apparatus in a vacuum relief mode.

Turning to FIG. 5, second valve member 106 of valve assembly 84 is movable in opposition to biasing member 110 away from its closed position in sealed relation to second valve seat 104 when fluid in cavity 28 of pin joint 20 is at a pressure less than a second predetermined pressure level to allow fluid from atmosphere to enter passage 64 through bore 100, as shown by the arrow C. From there, the fluid is able to flow through bore 78, ports 80 and orifice 52 into cavity 28 to allow the pressure in the cavity to rise to the second predetermined pressure level, to thereby allow second biasing member 110 to urge second valve 106 back to its closed position.

Here, it should be understood that the first predetermined pressure level is contemplated to be a positive pressure, or a pressure in cavity 28 greater than the pressure of the atmosphere surrounding pin joint 20. Conversely, it is contemplated that the second predetermined pressure level will be a negative pressure or partial vacuum condition in cavity 28, or a differential pressure condition wherein pressure in the cavity 28 is lower than the pressure of the atmosphere. Further, it should be understood that during the operation of valve assembly 84, bucket 18 and lift arm 16 will often be being moved one relative to the other such that pin joint 20 is likely to be rotated about axis 30 thereof and otherwise tilted and rolled through a wide range of orientations wherein oil contained in cavity 28 of the pin joint may enter orifice 52. Additionally, oil may splash or slosh into orifice 52 due to abrupt stoppage of the movement and other causes. Thus, it is important to prevent oil loss through valve assembly 84 to the extent reasonably possible. Referring again to FIG. 3, annular splash guard 82 extending around dipstick 72 adjacent ports 80 prevents entry of oil into ports 80 during such articulation and movement. Splash guard 82 can be of rigid or flexible construction and can be integrally formed with dipstick 72 as shown, or a separate member attached thereto, as desired. Slash guard 82, in combination with the transverse orientation of port 80, and the relatively small size of ports 80, has been found to minimize entry of oil into bore 78 and port 64. Additionally, bore 78 and the portion of passage 64 located between ports 80 and valve assembly 84 is sufficiently large to contain oil which enters port 80, the oil being able to easily drain back into cavity 28 through ports 80 when pin joint 20 returns to an orientation wherein the dipstick is more upright.

Referring again to FIG. 2, distal end 76 of dipstick 72 preferably includes indicia such as spaced lines or the like, as shown, for indicating whether the oil in cavity 28 is at the predetermined level A. Because pin joint 20 is subjected to substantial movement, including movement wherein combination relief vent and dipstick apparatus 56 can be inverted, body member 58 of apparatus 56 includes a hexagonal outer surface 116 adapted to be grasped by a wrench for threadedly tightening apparatus 56 in orifice 52. To check the oil level in cavity 28, the wrench can be used to loosen apparatus 56 such that apparatus 56 can be removed and dipstick 72 examined for the presence of oil at the appropriate location thereon.

Here, it is contemplated that apparatus 56 can be used with pin joints that have various distances between the outer surface of lift arm 16 and the outer surface of pin 44 such that different length dipsticks are required. To accommodate this need, it is contemplated that dipstick 72 shown can be merely threadedly detached from body member 58 and replaced with a different dipstick having a suitable length for a particular application. As an additional problem, due to varying manufacturing tolerances, and the use of remanufactured components and the like, the distance between the outer surface of lift arm 16 or the other location against which apparatus 56 bears when tightened and the outer surface of pin 44 may vary such that the required oil level A is likewise varied with respect to apparatus 56 when mounted as shown.

Figure 6:
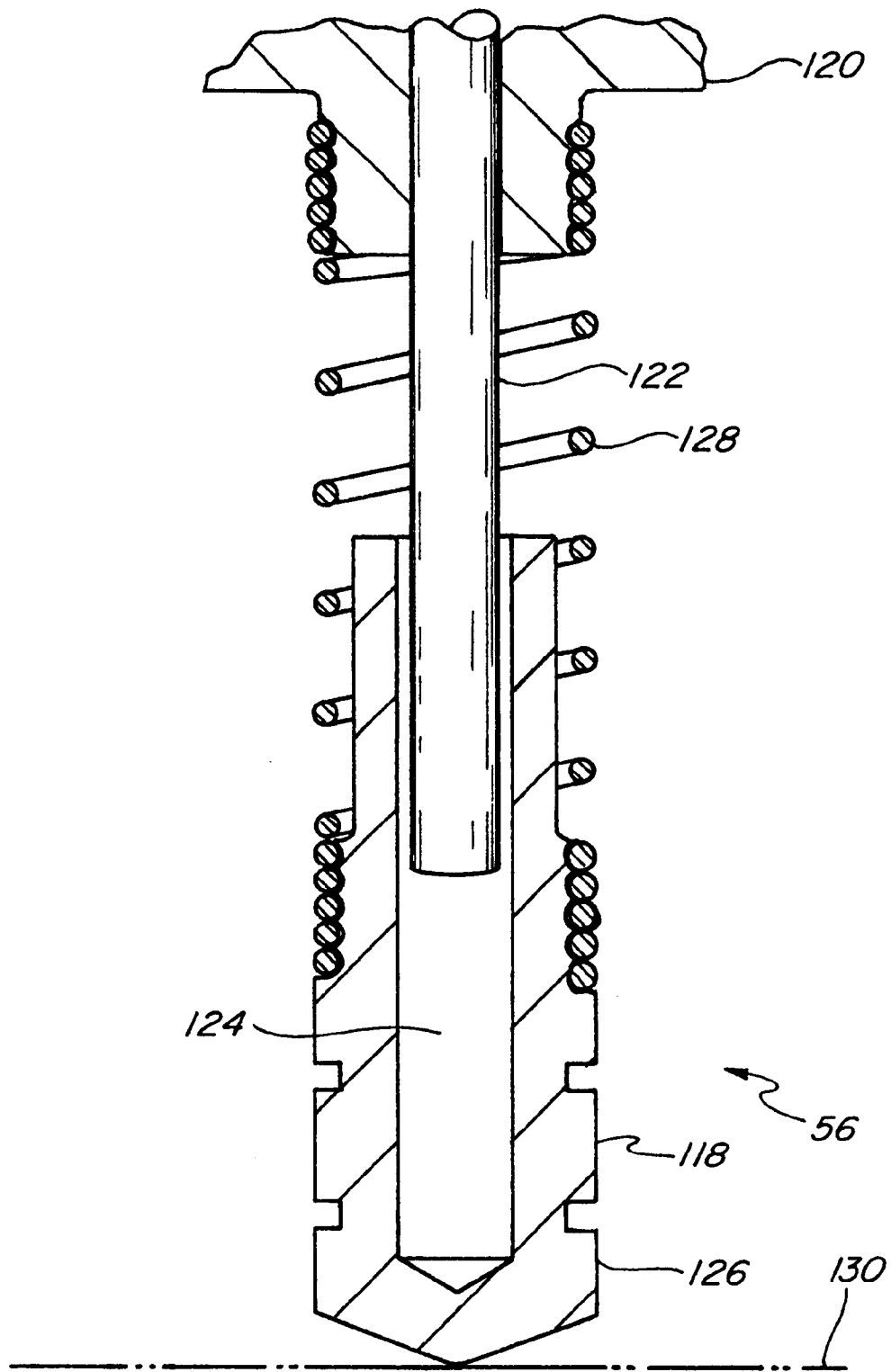
FIG. 6 is an enlarged fragmentary sectional view of an alternative embodiment of a dipstick for the combination relief vent and dipstick apparatus according to the present invention.

Referring to FIG. 6, to accommodate this possible variance, apparatus 56 can include an alternative dipstick embodiment 118. Dipstick 118 includes a proximal portion 120 which is mounted to body member 58 in the same or a similar manner as shown in FIGS. 3–5, and which includes a downwardly projecting guide pin 122. Guide pin 122 is telescopically received in a bore 124 of a distal end portion 126 attached to proximal portion 120 by a compression spring 128. Spring 128 is of sufficient length when in a partially compressed state such that when apparatus 56 is mounted in an orifice such as orifice 52 of a pin joint such as pin joint 20, distal end portion 126 will bear against the opposing outer surface of pin 44, denoted by dashed line 130. Since oil level A (FIG. 2) covers or immerses the pin, when the oil level is sufficient, at least some part of distal end portion 126 will be immersed in the oil when the distal end portion bears against the surface of the pin. In this way, the location of the pin surface, or the location of the surface against which apparatus 56 bears when mounted, can vary within the permissible travel of distal end portion 126. Here, it is likewise contemplated that other alternative dipstick constructions having a variable length capability can be used, such as a telescoping dipstick which extends under its own weight to a position in abutting relation with the pin.

Figure 7:
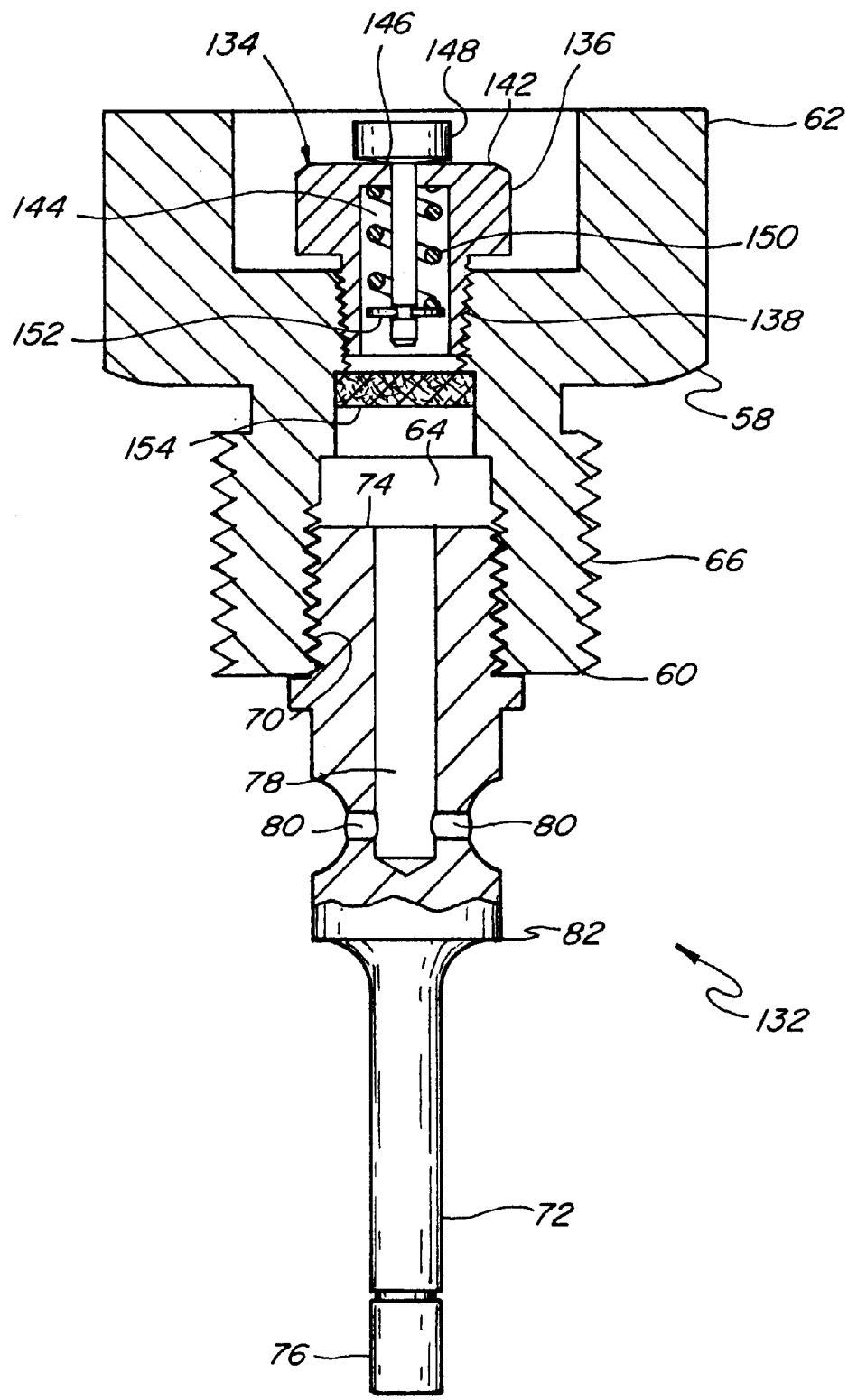
FIG. 7 is a cross-sectional view of an alternative embodiment of a combination relief vent and dipstick apparatus of the invention.

Referring to FIG. 7, another combination relief vent and dipstick apparatus 132 constructed and operable according to the teachings of the present invention is shown. Like combination relief vent and dipstick apparatus 56 described herein above, apparatus 132 is adapted to be threadedly mounted in orifice 52 of pin joint 20 in communication with cavity 28. Apparatus 132 includes a body member 58 having a first end portion 60 and an opposite second end portion 62, and a passage 64 extending through body member 58 between end portions 60 and 62. First end portion 60 of body member 58 includes an externally threaded portion 66 threadedly engageable with threaded portion 54 of lift arm 16 (FIG. 2) for removably mounting apparatus 132 with first end portion 60 of body member 58 in sealed relation in orifice 52 in communication with cavity 28, and second end portion 62 in communication with atmosphere. Body member 58 additionally includes an internal threaded portion 70 extending around passage 64 adjacent second end portion 62. An elongate dipstick 72 having an externally threaded end 74 is threadedly mounted to threaded portion 70 of body member 58 such that an opposite distal end 76 of the dipstick extends downwardly so as to extend through orifice 52 of pin joint 20 a predetermine distance into cavity 28 thereof so as to be at least partially immersed in the oil therein when at the predetermined level A. Threaded end 74 of dipstick 72 additionally includes a longitudinally extending bore 78 communicating with a pair of transverse extending ports 80 positioned for communicating with cavity 28 through orifice 52. Dipstick 72 additionally includes a splash guard 82 extending therearound between distal end 76 and ports 80.

Apparatus 132 includes a valve assembly 134 mounted in passage 64. Valve assembly 134 includes a body member 136 having a threaded end 138 threadedly mounted in an internally threaded portion 140 of passage 64 and an opposite end 142 positioned so as to be in communication with atmosphere. Body member 136 has a passage 144 therethrough for communicating passage 64 with atmosphere, and a valve seat 146 on opposite end 142 around passage 144. A valve member 148 is disposed in passage 144 and positioned for sealably engaging valve seat 146. A biasing member 150 which is a coil spring is compressed between a spring retainer 152 on valve member 148 and opposite end 142 of body member 136 to yieldably urge valve member 148 toward a closed position in engagement with valve seat 146. In operation, fluid pressure conditions in cavity 28 of pin joint 20 will be communicated through orifice 52, ports 80, bore 78, passage 64 and passage 144 to valve member 148. Fluid at a pressure greater than a first predetermined pressure level is operable to act against valve member 148 to move it in opposition to biasing member 150 away from its closed position in sealed engagement with valve seat 146 to one of a range of open positions spaced therefrom such that the fluid can pass between valve seat 146 and valve member 148 to escape to atmosphere, valve member 148 returning to its closed position when the pressure in cavity 28 is lowered to the first predetermined pressure level.

An advantage of apparatus 132 is its modular construction, that is, the ability to remove and replace valve assembly 134 and dipstick 72, such that a variety of different valve assemblies 134 and different dipsticks such as dipsticks 72 and 118 can be interchangeably mounted to body member 58 to meet the needs of a particular application. For instance, regarding the valve assembly, in one application, a relief pressure of 3 to 6 pounds per square inch (psi) above ambient atmospheric pressure may be required, whereas in another application a relief pressure of 15 to 20 psi above ambient may be required, the same body member 58 and dipstick 72 being usable and the different pressure relief pressures being attainable simply by using valve assemblies 134 that provide pressure relief at the required pressure levels. Here, it should be noted that apparatus 132 can include a wide variety of valve assembly constructions in the alternative to valve assembly 134 shown, including valve assemblies providing vacuum relief and assemblies providing both pressure and vacuum relief, depending on the requirements of particular applications. Similarly, dipsticks 72 and 118 having different lengths can be selected, based on the needs of particular applications. Another advantage of apparatus 132 is that in case of failure of a valve assembly 134, the valve assembly 134 can simply be removed from body member 58 and replaced with a new valve assembly or repaired and replaced.

Here, although dipstick 72 and valve assembly 134 are shown as being threadedly engaged with body member 58, it should be understood that it is contemplated that a wide variety of different manners or attachment of those members to body member 58 can be utilized, including, but not limited to, by press fit, gluing, or retention using a snap ring, pin or other detent device.

As an additional feature, combination relief vent and dipstick apparatus 56 and apparatus 132 can each include a filter medium, such as filter medium 154 disposed between dipstick 72 and the valve assembly thereof, for filtering the flow of fluids such as oil through passage 64 to the valve assembly to prevent contamination and impairment of operation thereof, and for filtering air flow into cavity 28. Filter medium 154 can be composed of any suitable porous material, such as, but not limited, steel wool, wire mesh, fiber glass, centered metal or the like. It is also contemplated that filter medium 154 can be located at other locations on apparatus 56 and apparatus 132, such as atop the valve assembly, and can be a cartridge type device so as to be easily removable and replaceable.

INDUSTRIAL APPLICABILITY

The oil filled pin joint including a combination relief vent and dipstick apparatus of the present invention has utility for a wide variety of applications wherein it is desired to take advantage of the low maintenance and other benefits of an oil filled joint, while avoiding early seal failure and other problems commonly associated therewith. The combination relief vent aspect of the present invention is operable for reliably maintaining pressure conditions in an oil filled pin joint within a selected predetermined range as established by the first and second predetermined pressure levels such that high pressures are not exerted against the seals of the pin joint, and lower pressures are not present so as to draw air and contaminants into the joint through the seals. Additionally, the present apparatus has the capacity to dissipate abrupt and rapid pressure increases, such as pressure spikes and the like before resultant seal damage can occur.

Other aspects, objects and advantages of the present invention can be obtained from a study of the drawings, the disclosure and the appended claims.

What is claimed is:

1. A combination relief vent and dipstick apparatus adapted to be removably mounted in an orifice of a pin joint in communication with a sealed cavity therein adapted for containing a predetermined level of oil, the apparatus comprising:

a body member having first and second opposite end portions, a passage extending therethrough between the opposite end portions, a first valve seat extending around the passage, and structure for removably mounting the body member in the orifice with the first end portion in communication with the cavity, the first end portion including a dipstick adapted to extend into the cavity so as to be partially immersed in the oil in the cavity when at the predetermined level so as to provide an indicator of the level; and a valve assembly mounted in the passage of the body member, the valve assembly including a first valve member movable between a closed position in sealed relation to the first valve seat and a range of open positions spaced from the first valve seat, and a first biasing member yieldably urging the first valve member toward the closed position, fluid in the cavity at a pressure greater than a first predetermined pressure level being operable to move the first valve member in opposition to the first biasing member away from the closed position to allow some of the fluid to escape from the cavity to atmosphere through the passage such that the pressure is reduced to the first predetermined pressure level, the valve assembly including a second valve seat, a second valve member movable between a closed positioned in sealed relation to the second valve seat and a range of open positions spaced from the second valve seat, and a second biasing member yieldably urging the second valve member toward its closed position, fluid in the cavity at a pressure less than a second predetermined pressure level being operable to move the second valve member in opposition to the second biasing member away from the closed position to allow fluid from atmosphere to enter the cavity through the passage to allow the pressure in the cavity to rise to the second predetermined pressure level.

2. The apparatus of claim 1, wherein the second valve seat is located on the first valve member and extends around at least one aperture therethrough.

3. The apparatus of claim 1, wherein the passage communicates with the cavity through a port in the dipstick.

4. The apparatus of claim 3, wherein the dipstick includes a splash guard adjacent the port in position for limiting entry of the oil into the port from the cavity.

5. The apparatus of claim 1, wherein the dipstick has a variable length.

6. The apparatus of claim 1, wherein the dipstick is removably mounted to the body member so as to be removable and replaceable.

7. The apparatus of claim 1, wherein the second predetermined pressure level is a negative pressure condition.

8. The apparatus of claim 1, further comprising a filter for filtering fluid flow through the passage.

9. An oil filled pin joint, comprising:

a structural element defining a sealed cavity containing at least one bearing supporting a pin for rotation relative thereto and a quantity of oil for lubricating the at least one bearing and the pin, the structural element including an orifice above the oil communicating with the cavity; and a combination relief vent and dipstick apparatus removably mounted in the orifice, including a body member having first and second opposite end portions, a passage extending therethrough between the opposite end portions, a first valve seat extending around the passage, structure for removably mounting the body member in the orifice with the first end portion in communication with the cavity, the first end portion including a dipstick adapted to extend into the cavity so as to be at least partially immersed in the oil in the cavity when at a predetermined level so as to provide an indicator of the level, a valve assembly mounted in the passage of the body member, the valve assembly including a first valve member movable between a closed position in a sealed relation to the first valve seat and a range of open positions spaced from the first valve seat, a first biasing member yieldably urging the first valve member toward the closed position, fluid in the cavity at a pressure greater than a first predetermined pressure level being operable to move the first valve member in opposition to the first biasing member away from the closed position to one of the open positions allow some of the fluid to escape from the cavity to atmosphere through the passage such that the pressure is reduced to the first predetermined pressure level, the valve assembly including a second valve seat, a second valve member movable between a closed position in sealed relation to the second valve seat and a range of open positions spaced from the second valve seat, and a second biasing member yieldably urging the second valve member toward its closed position, fluid in the cavity at a pressure below a second predetermined pressure level being operable to move the second valve member in opposition to the second biasing member away from its closed position to allow fluid from atmosphere to enter the cavity through the passage to allow the pressure in the cavity to rise to the second predetermined pressure level.

10. The pin joint of claim 9, wherein the second valve seat is located on the first valve member around at least one aperture therethrough.

11. The pin joint of claim 9, wherein the passage communicates with the cavity through a port in the dipstick.

12. The pin joint of claim 11, wherein the dipstick includes a splash guard adjacent the port in position for limiting entry of the oil into the port from the cavity.

13. The pin joint of claim 9, wherein the dipstick has a variable length.

14. The pin joint of claim 13, wherein the dipstick has a movable distal end portion and a member disposed for biasing the distal end portion against the pin.

15. The pin joint of claim 9, further comprising a filter for filtering fluid flow through the passage.

16. A combination relief vent and dipstick apparatus adapted to be removably mounted in an orifice of a pin joint in communication with a sealed cavity therein adapted for containing a predetermined level of oil, the apparatus comprising:

a body member having first and second opposite end portions, a passage extending therethrough between the opposite end portions, a valve seat extending around the passage, and structure for removably mounting the body member in the orifice with the first end portion in communication with the cavity, the first end portion including a dipstick adapted to extend into the cavity so as to be partially immersed in the oil in the cavity when at the predetermined level so as to provide an indicator of the level; and a valve assembly removably mounted in the passage of the body member, the valve assembly including a body having a passage therethrough and a valve seat extending around the passage, a valve member movable between a closed position in sealed relation to the valve seat and a range of open positions spaced from the valve seat, and a biasing member yieldably urging the valve member toward the closed position, fluid in the cavity at a pressure greater than a predetermined pressure level being operable to move the valve member in opposition to the biasing member away from the closed position to allow some of the fluid to escape from the cavity to atmosphere through the passage such that the pressure is reduced to the predetermined pressure level, and fluid in the cavity at a pressure less than a predetermined pressure level being operable to move the valve member in opposition to the biasing member away from the closed position to allow some external fluid to enter the cavity from the atmosphere through the passage such that the pressure rises to the predetermined pressure level.

* * * * *